(12) United States Patent
Zhang et al.

(10) Patent No.: US 11,185,983 B2
(45) Date of Patent: Nov. 30, 2021

(54) POSITION CONTROL METHOD FOR SERVO, COMPUTER READABLE STORAGE MEDIUM, AND ROBOT

(71) Applicant: UBTECH ROBOTICS CORP LTD, Shenzhen (CN)

(72) Inventors: Lifu Zhang, Shenzhen (CN); Wenhua Fan, Shenzhen (CN); Hanyu Sun, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 198 days.

(21) Appl. No.: 16/713,012

(22) Filed: Dec. 13, 2019

(65) Prior Publication Data
US 2021/0046647 A1    Feb. 18, 2021

(30) Foreign Application Priority Data

Aug. 15, 2019    (CN) .......................... 201910752144.5

(51) Int. Cl.
*B25J 9/16* (2006.01)
*H02P 29/00* (2016.01)
*H02P 23/00* (2016.01)

(52) U.S. Cl.
CPC ........ *B25J 9/1664* (2013.01); *H02P 23/0027* (2013.01); *H02P 23/0077* (2013.01); *H02P 29/00* (2013.01)

(58) Field of Classification Search
CPC . B25J 9/1664; H02P 23/0027; H02P 23/0077; H02P 29/00
USPC ...................................... 318/560, 567, 568.1
See application file for complete search history.

(56) References Cited

U.S. PATENT DOCUMENTS

| 8,203,300 | B2 * | 6/2012 | Krah ...................... | G05B 11/42 318/636 |
| 9,853,585 | B2 * | 12/2017 | Yoshiura .................. | G05D 1/00 |

* cited by examiner

*Primary Examiner* — David Luo

(57) ABSTRACT

A position control method for a servo, includes: receiving, from a control terminal, a motion control command that comprises a motion planning parameter about position of an output shaft of the servo; acquiring speed information or time information indicated by the motion planning parameter, and determining a constant parameter control duration according to the speed information or time information; determining a control parameter corresponding to a constant parameter control stage according to the constant parameter control duration and a preset constant parameter; performing a transient adjustment to the servo when the constant parameter control stage ends, and changing the control parameter to an adaptive operation parameter when the transient adjustment ends; and controlling a rotation angle of the output shaft of the servo to perform a position control of the servo, based on duration values and control parameters corresponding to each of a plurality of control stages.

15 Claims, 7 Drawing Sheets

POSITION CONTROL METHOD FOR SERVO, COMPUTER READABLE STORAGE MEDIUM, AND ROBOT

CROSS REFERENCE TO RELATED APPLICATIONS

This application claims priority to Chinese Patent Application No. 201910752144.5, filed Aug. 15, 2019, which are hereby incorporated by reference herein as if set forth in its entirety.

BACKGROUND

1. Technical Field

The present disclosure generally relates to robots, and particularly to a position control method for a servo of a robot.

2. Description of Related Art

Servos are key components of humanoid robots. It is difficult for many conventional position control methods for servos to ensure that the robots can achieve rapid motion response and high position control accuracy, while eliminating the adverse effects of motion jitter and noise. To achieve the above performances, the robots are usually required to have hardware, such as processors, data memories, program memories, and sensors, meeting high requirements, which add burdens to cost control. Many conventional position control methods for servos cannot ensure that the robots can achieve better position control effects with ordinary hardware.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
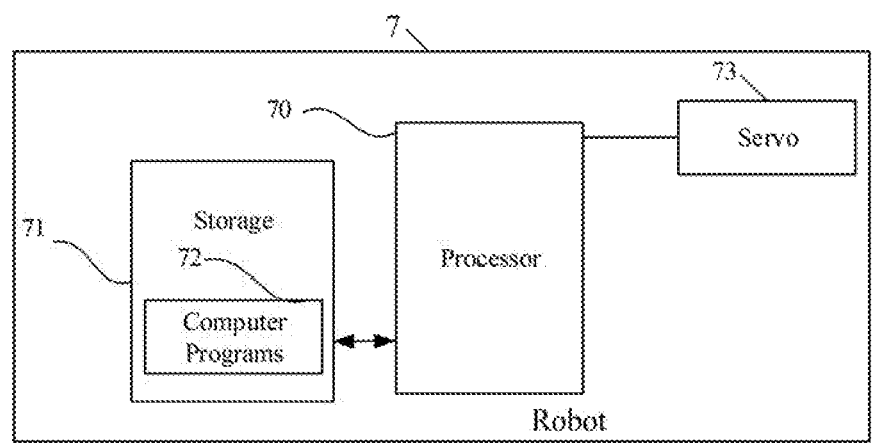
FIG. 1 is a schematic block diagram of a robot according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 7:
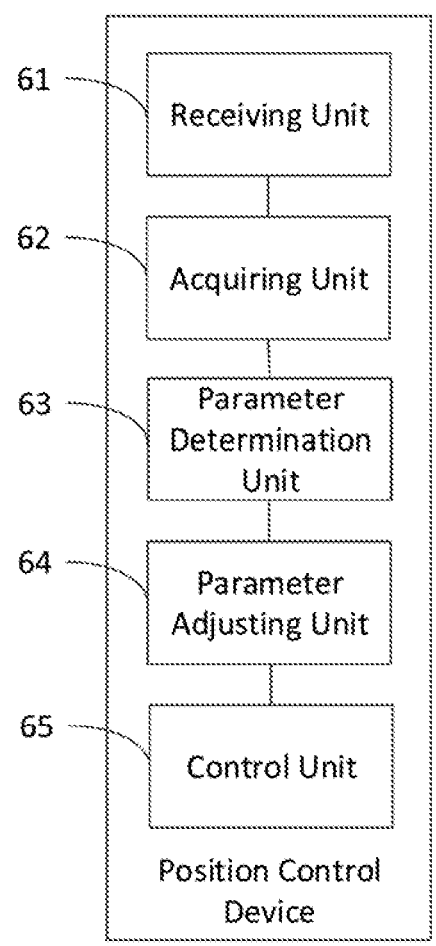
FIG. 7 is a schematic block diagram of a position control device according to an embodiment.

FIG. 1 is a schematic block diagram of a robot according to an embodiment. The robot 7 includes a processor 70, a storage 71, one or more computer programs 72 stored in the storage 71 and executable by the processor 70, and a servo 73 electrically connected to the processor 70. When the processor 70 executes the computer programs 72, the steps in the embodiments of the method for controlling the servo 73, such as steps 101 through 105 in FIG. 2, and functions of modules/units in the embodiments, such as units 61 through 65 in FIG. 7, are implemented.

The processor 70 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 71 may be an internal storage unit of the robot 7, such as a hard disk or a memory. The storage 71 may also be an external storage device of the robot 7, such as a plug-in hard disk, a smart memory card (SMC), and a secure digital (SD) card, or any suitable flash cards. Furthermore, the storage 71 may also include both an internal storage unit and an external storage device. The storage 71 is used to store computer programs, other programs, and data required by the robot. The storage 71 can also be used to temporarily store data that have been output or is about to be output.

It should be noted that FIG. 1 is merely an example of the robot 7, and does not limit the robot 7. The robot may include components different in numbers from those illustrated, or incorporate some other different components. For example, the robot may also include an input and output device, a network access device, a bus, and the like.

Figure 2:
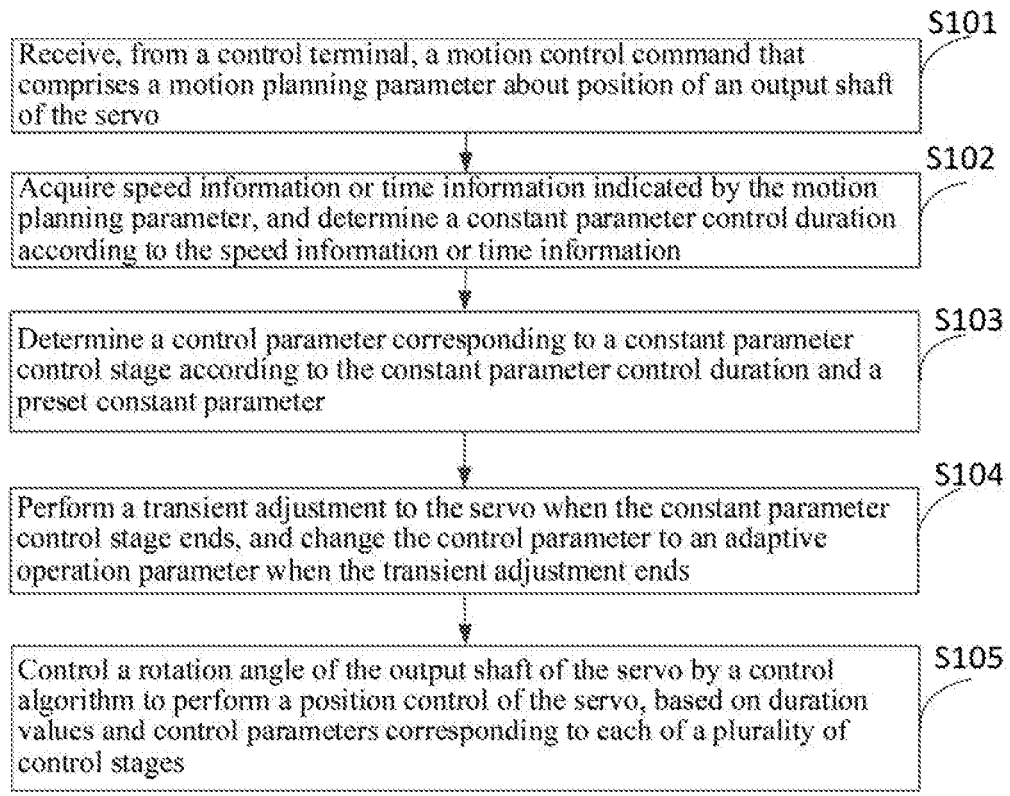
FIG. 2 is a flow chart of a position control method for a servo of the robot of FIG. 1.

FIG. 2 is a flow chart of a position control method for the servo of the robot 7 according to one embodiment. In the embodiment, the method includes the following steps:

Step S101: receiving, from a control terminal, a motion control command that includes a motion planning parameter about position of an output shaft of the servo 7.

In the embodiment, the robot 7 communicates with the control terminal in a wired or wireless manner. The control terminal may be an integrally connected control module, or may be an independent external terminal for performing arithmetic operations or providing interactive services, which is not limited herein.

Figure 3:
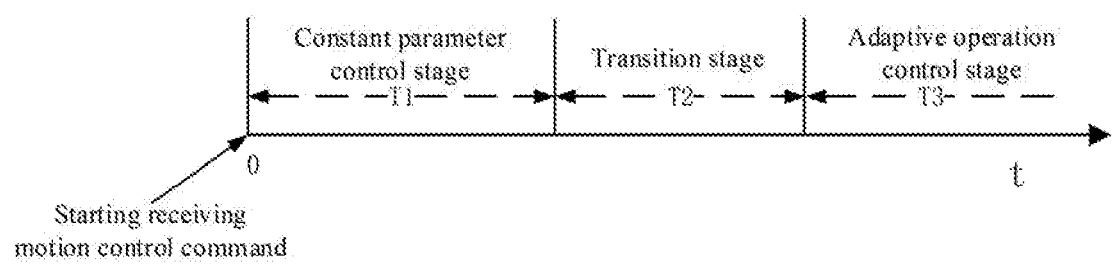
FIG. 3 is a schematic diagram showing the three different stages corresponding to a single motion control command.

In the embodiment, the control process after receiving each motion control command is divided into a constant parameter control stage, a transition stage, and an adaptive parameter control stage. For ease of understanding, FIG. 3 shows a schematic diagram of a control process corresponding to a single motion control command. The motion control command is used to perform position movement control on the rotation angle of the output shaft of the servo, and it carries a motion planning parameter regarding the position of the output shaft of the servo, so as to complete the planning of a target angle and time of the output shaft of the servo during rotation. The motion planning parameter includes, but are not limited to, target position information, speed information, and time parameter of the output shaft of the servo.

Since the control parameters corresponding to the constant parameter control stage are preset, the motion control command can be analyzed according to a preset rule to obtain the motion planning parameter. The control parameters include algorithm coefficients and unknown parameters associated with each control stage, which are used to control the rotation angle of the output shaft of the servo and perform the position control.

The response speed and the noise generated by the servo during the operation of the servo are mainly determined by the constant parameters in the constant parameter control stage. The control parameters that are used when the response speed of the servo and the noise level meet desired requirements will be recorded during tests, and then set, in the controller of the servo, as the constant parameter corresponding to constant parameter control stage.

Step S102: acquiring speed information or time information indicated by the motion planning parameter, and determining a constant parameter control duration according to the speed information or time information.

In the embodiment, a calculation is performed to the motion planning parameter to determine the constant parameter control duration indicated by the motion planning parameter.

Specifically, if it is detected in the motion control command that the motion planning parameter directly includes the time information of the output shaft of the servo in the constant parameter control stage, then the duration extracted from the time information is determined as the constant parameter control duration of the constant parameter control stage.

If it is detected that the motion planning parameter includes the speed information and the target position information about the output shaft of the servo operating in the constant parameter control stage, then the real-time servo output shaft position information is detected. The constant parameter control duration of the servo is then calculated according to the target position information, the real-time servo output shaft position information, and the speed information.

For example, assuming that the real-time position information of the servo output shaft when receiving a motion control command is $A_1$, the real-time system time is $T_0$, the target position information identified from the constant parameters is $A_2$, and the speed information is V, the calculated constant parameter control time is $T_1=(A_2-A_1)/V$, and the constant parameter control time is $[T_0, T_0+T_1]$, i.e. the period starting from time point T0 and ending at time point T0+T1.

Step S103: determining a control parameter corresponding to a constant parameter control stage according to the constant parameter control duration and a preset constant parameter, the constant parameter control stage being a first stage in execution of the motion control command.

In the embodiment, various detected known parameters are input into a preset control algorithm to obtain various control parameters associated with the output shaft of the servo during operation, thereby ensuring its operation within the constant parameter control time. The above-mentioned control algorithms include, but are not limited to, Proportion Integration Differentiation (PID) control algorithms, Proportion Integration (PI) control algorithms, Proportion Differentiation (PD) control algorithms, and Proportion (P) control algorithms, etc.

Exemplarily, one PID control algorithm is expressed as follows: $u(n)=k_p*e(n)+k_i*e(i)+k_d*(e(n)-e(n-1))$. One PI control algorithm is expressed as follows: $u(n)=k_p*e(n)+k_i*e(i)$. One control algorithm is expressed as follows: $u(n)=k_p*e(n)+k_d*(e(n)-e(n-1))$. The above k_p, k_i, and k_d are the above-mentioned constant parameters preset in the controller of the servo.

Step S104: performing a transient adjustment to the servo when the constant parameter control stage ends, and changing the control parameter to an adaptive operation parameter when the transient adjustment ends.

Referring to FIG. 3, after the constant parameter control stage ends, the transition stage and the adaptive parameter control stage during the execution of the motion control command are sequentially entered. In this process, the control parameters will change with the change of time and real-time control error. That is, as time passes, the servo is gradually transitioned from constant parameter control to adaptive parameter control.

The constant parameter control stage is mainly used to control the smooth operation of the servo. In order to ensure the control stability of the servo and make it have less motion noise, the constant parameter corresponding to the constant parameter control stage will be relatively small. The adaptive parameter control stage is mainly used for the position accuracy adjustment that needs to be performed after rotation of the output shaft of the servo is completed. Therefore, the obtained adaptive parameter is greater than the constant parameter in the constant parameter control stage. The transition stage is used for smoothly transitioning the relatively small control parameter of the constant parameter control stage to the relatively large control parameter of the adaptive control stage. Therefore, the coordinated work of the three-stage process can ensure that the servo can have smooth motion performance and high position control accuracy.

In the embodiment, based on the real-time control error at each time and time relationship, the real-time control parameters of the output shaft of the servo at each time point is updated and obtained.

Step S105: controlling a rotation angle of the output shaft of the servo by a control algorithm to perform a position control of the servo, based on duration values and control parameters corresponding to each of a plurality of control stages, wherein the control stages comprise the constant parameter control stage, a transition stage, and an adaptive parameter control stage, and the transition stage and the adaptive parameter control stage are a second stage and a third stage in the execution of the motion control command.

At each time point, according to the motion planning parameter obtained at that time point, the output shaft of the servo is controlled to operate in the control stage to which the time point belongs, so that it gradually reaches the target position indicated by the motion control command.

In the embodiment, by acquiring the motion planning parameter carried by the motion control command and controlling the speed information obtained by the motion planning parameter, the output shaft of the servo is controlled to operate within a specified constant parameter control period, and a transient adjustment is performed to the servo in subsequent time period and an adaptive parameter is obtained. The control process of a single motion control command of the servo is divided into three stages, i.e. the constant parameter control stage, the transition stage and the adaptive parameter control stage, which enables the servo to perform motion response operations smoothly and quietly, while achieving high position control accuracy. Since the method for controlling the position of the servo provided by the embodiment of the present disclosure only requires a position sensor at the output shaft of the servo and sampling a motor current, it is ensured that the robot can also achieve better position control with ordinary hardware.

Figure 4:
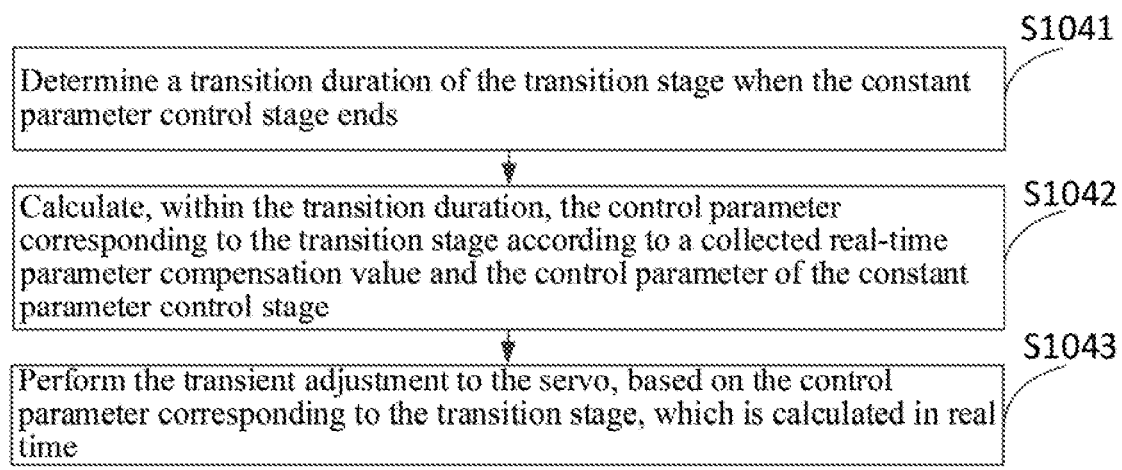
FIG. 4 is an implementation process of the step S104 of the method of FIG. 2.

In one embodiment, FIG. 4 shows a specific implementation process of the step S104, which is detailed as follows:

Step S1041: determining a transition duration of the transition stage when the constant parameter control stage ends.

Figure 5:
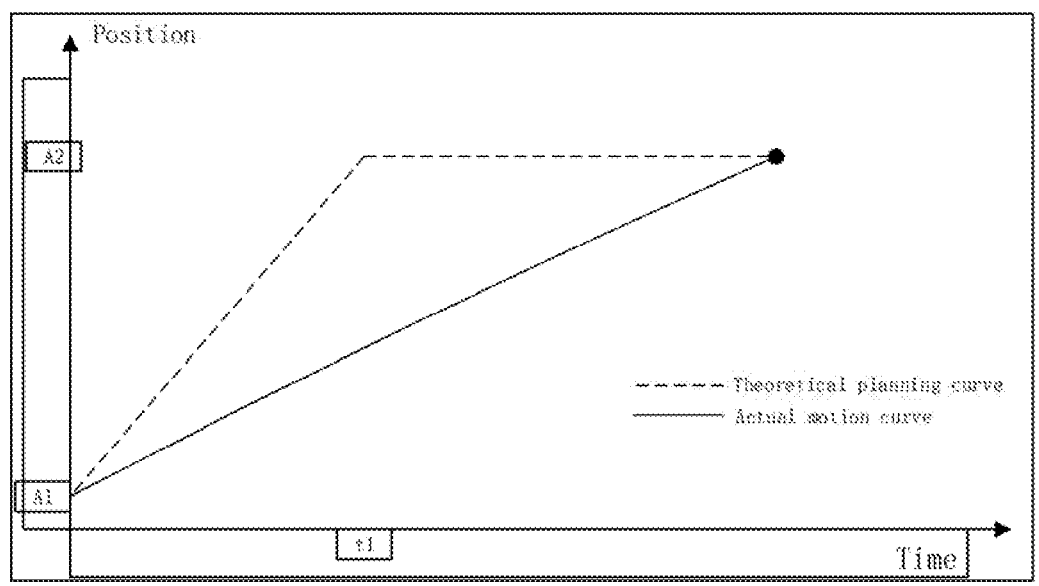
FIG. 5 is a schematic diagram of a servo position control effect provided when the speed of a constant parameter control stage exceeds a maximum speed of the servo according to an embodiment.

The method of position control for the servo according to the embodiment of the present disclosure is applicable to a situation where the motion control command received by the servo does not meet the actual operating conditions. For example, the speed indicated by the speed information that is planned by the motion planning parameter carried by the motion control command in the constant parameter control stage exceeds the maximum operating speed of the output shaft of the servo, and the control effect shown in FIG. 5 will appear at this time. As shown in FIG. 5, in the constant parameter control stage, the servo position control error increases as time passes, and the maximum control error value appears at time T1. Therefore, by adding the maximum control error values of the servo to the calculation formula of the duration of the transition stage, the duration of the transition stage can be adaptively increased, thereby ensuring that during the increased duration, the increase in the motion planning parameter of the transition stage is directly proportional to the maximum control error in the constant parameter control stage, which ensures that the servo can obtain a smoother transition effect.

In the process of controlling the operation of the servo in the constant parameter control stage based on the constant parameter, a number of control error values are recorded at a preset frequency. The control error value recorded at each time point indicates the difference between the target position of the output shaft of the servo and its actual position at that time point during the whole constant parameter control stage. The motor current value of the servo at each time point is also recorded.

When the constant parameter control duration ends, a maximum control error value is selected from the recorded control error values. A calculation is performed to the above-mentioned maximum control error value and the above-mentioned motor current values according to a preset formula to obtain a transition duration value $T_2$ of the transition stage. The formula is as follows: $T_2=T+k_1 \cdot Max(abs(e(n)))+k_2 \cdot (\Sigma_0^n I(n))/T_1$, where T represents a preset minimum transition duration value, T1 represents a duration value corresponding to the constant parameter control stage, Max(abs(e(n))) represents the maximum control error value, I(n) represents the nth one of the motor current values detected during the position control of the servo and n is an integer greater than zero, $(\Sigma_0^n I(n))/T_1$ represents the average motor current in the constant parameter control section, and $K_1$ and $k_2$ are preset coefficients greater than zero.

In the embodiment, the minimum transition duration I is preset. Preferably, the minimum transition duration T is in the range of 50 to 500 ms.

After obtaining the transition duration value $T_2$ corresponding to the transition stage, the end time point of the constant parameter control stage is acquired. The time period with the end time point as the starting point and the duration as the transition duration value is determined as the transition stage of the servo.

Step S1042: calculating, within the transition duration, the control parameter corresponding to the transition stage according to a collected real-time parameter compensation value and the control parameter of the constant parameter control stage.

During the transition stage, the control error values of the servo at various time points are recorded. In the embodiment, real-time parameter compensation values of the servo at various time points are obtained. The relationship between the real-time parameter compensation value of the servo at each time point and its real-time control error is a preset functional relationship, including linear, quadratic, or cubic functional relationship.

Exemplarily, if the control parameters of the output shaft of the servo during angular operation include $k_p$, $k_i$, and $k_d$, the relationship between the real-time parameter compensation values $k_{pa}$, $k_{ia}$, $k_{da}$ and the real-time control error e (n) at any time is as follows:

$$\begin{cases} k_{pa} = t*k_3*e(n)^2/T_2 \\ k_{ia} = t*k_4*e(n)^2/T_2 \\ k_{da} = t*k_5*e(n)^2/T_2 \end{cases},$$

where $k_3$, $k_4$, and $k_5$ represent preset coefficients greater than zero, T2 represents the above-mentioned transition duration value, t represents the real-time operating duration in the transition stage.

In the embodiment, a control parameter corresponding to a transition stage is referred to as a transition stage control parameter. The relationship between the transition stage control parameter $K[k_p, k_i, k_d]$ and time is as follows: $K[k_p, k_i, k_d]=K_0[k_{p0}, k_{i0}, k_{d0}]+K_A[k_{pa}, k_{ia}, k_{da}]*t/T_2$, $t\in[0, T_2]$, where $K_0[k_{p0}, k_{i0}, k_{d0}]$ represents the control parameter corresponding the constant parameter control stage, $K_A[k_{pa}, k_{ia}, k_{da}]$ represents the real-time parameter compensation value of the servo at the current moment, $T_2$ represents the transition duration of the transition stage, and t represents the real-time operating duration within the transition stage.

Step S1043: performing the transient adjustment to the servo, based on the control parameter calculated in real time.

According to the transition stage control parameters at each time point, the transient adjustment is made to the servo so that when the adjustment is completed, the output shaft of the servo keeps rotating to achieve effective control of the position of the output shaft of the servo.

In the embodiment, the operating load of the servo is determined by using the average current value in the constant parameter control stage, and the duration of the transition stage is calculated based on the actual operating load of the output shaft of the servo in the constant parameter control stage, so that the finally obtained control parameters of the transition stage are the operation results obtained by adding a load consideration factor, which ensures that the position control method of the embodiment can obtain better performance under light load and heavy load conditions, and improves the accuracy of the servo position control.

Figure 6:
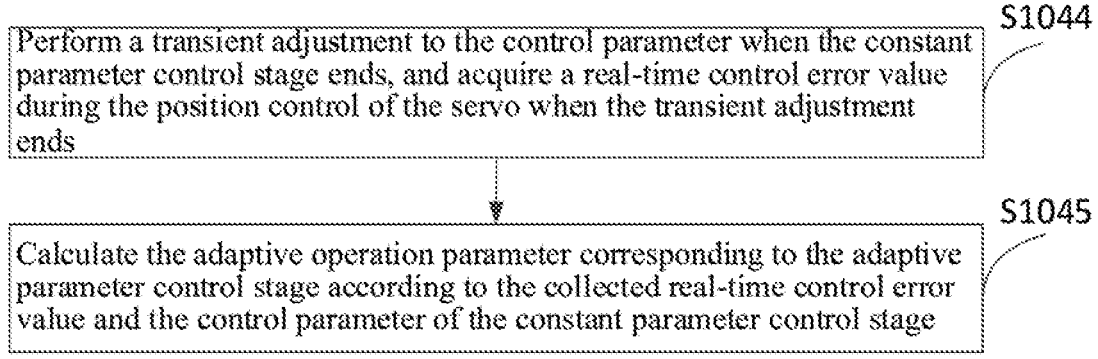
FIG. 6 is an implementation process of the step S104 of the method of FIG. 2 according to an alternative embodiment.

In one embodiment, acquiring of the control parameter of the adaptive parameter control stage is further defined. As shown in FIG. 6, on the basis of the previous embodiment, FIG. 6 shows a specific implementation process of the step S104, which is detailed as follows:

Step S1044: performing the transient adjustment to the servo when the constant parameter control stage ends, and acquiring real-time control error values during the position control of the servo when the transient adjustment ends.

It can be known from the embodiments above that the control parameters of the transition stage are related to the real-time running time of the servo. In the embodiment, the control parameter of the adaptive parameter control stage is no longer related to time, but only related to the real-time control error values of the servo. Therefore, the real-time control error value of the servo at each time point is detected and read.

In the embodiment, within the time range corresponding to the adaptive parameter control stage, real-time parameter compensation values of the servo at various time points are obtained. The relationship between the real-time parameter compensation value of the servo at each time point and its real-time control error is a preset functional relationship, including linear, quadratic, or cubic functional relationship.

Preferably, the above-mentioned relationship is a quadratic functional relationship to achieve a high control accuracy while achieving a better control effect, and reducing the computational complexity.

Exemplarily, the relationship between the real-time parameter compensation values $k_{pa}$, $k_{ia}$, $k_{da}$ and real-time control error e (n) of the servo at any time is as follows:

$$\begin{cases} k_{pa} = k_3 * e(n)^2 \\ k_{ia} = k_4 * e(n)^2 \\ k_{da} = k_5 * e(n)^2 \end{cases},$$

wherein the $k_3$, $k_4$, and $k_5$ are preset coefficients.

Step S1045: calculating the adaptive operation parameter corresponding to the adaptive parameter control stage according to the collected real-time control error values and the control parameter of the constant parameter control stage.

In the embodiment, the control parameter corresponding to the adaptive parameter control stage are referred to as adaptive operation parameter. According to a preset formula, a calculation is performed to the real-time control error values and the control parameter corresponding to the constant parameter control stage to obtain an adaptive operation parameter of the servo. The formula above is as follows: K'[$k_p$, $k_i$, $k_d$]=K$_0$[$k_{p0}$, $k_{i0}$, $k_{d0}$]+K'$_A$[$k_{pa}$, $k_{ia}$, $k_{da}$], where K$_0$[$k_{p0}$, $k_{i0}$, $k_{d0}$] represents the control parameter corresponding to the constant parameter control stage, and K'$_A$[$k_{pa}$, $k_{ia}$, $k_{da}$] represents the real-time parameter compensation value of the servo.

According to the adaptive operation parameter at each time point, the servo is controlled to continue to run to achieve the precise control of the position of the servo. Until the next new motion control command is received, the operation of the servo in the adaptive parameter control stage is stopped, and the process returns to the step S101 above.

It should be noted that the sequence of the steps in the embodiments above does not necessarily mean the sequence of execution. The sequence of execution of each process should be determined by its function and internal logic, and should not constitute any limitation to the implementation process of the embodiments of the present disclosure.

FIG. 7 shows a schematic block diagram of a position control device according to an embodiment of the present disclosure. For convenience of description, only parts related to the embodiment are shown. The position control device illustrated in FIG. 7 may be an execution subject of the control method of the foregoing embodiments.

Referring to FIG. 7, in one embodiment, the position control device includes a receiving unit 61, an acquiring unit 62, a parameter determination unit 63, a parameter adjusting unit 64, and a control unit 65.

The receiving unit 61 receives a motion control command from a control terminal, and the motion control command includes a motion planning parameter about position of an output shaft of the servo.

The acquiring unit 62 acquires speed information or time information indicated by the motion planning parameter, and determines a constant parameter control duration according to the speed information or time information.

The parameter determination unit 63 determines a control parameter corresponding to a constant parameter control stage according to the constant parameter control duration and a preset constant parameter, and the constant parameter control stage is a first stage in execution of the motion control command.

The parameter adjusting unit 64 performs a transient adjustment to the servo when the constant parameter control stage ends, and changes the control parameter to an adaptive operation parameter when the transient adjustment ends.

The control unit 65 controls a rotation angle of the output shaft of the servo by a control algorithm to perform a position control of the servo, based on duration values and control parameters corresponding to each of a plurality of control stages.

The control stages include the constant parameter control stage, a transition stage, and an adaptive parameter control stage. The transition stage and the adaptive parameter control stage are a second stage and a third stage in the execution of the motion control command.

The parameter adjusting unit 64 includes a determination unit, a first calculation unit and a first adjusting unit. The determination unit determines a transition duration of the transition stage when the constant parameter control stage ends. The first calculation unit calculates, within the transition duration, the control parameter corresponding to the transition stage according to a collected real-time parameter compensation value and the control parameter of the constant parameter control stage. The first determination unit performs the transient adjustment to the servo, based on the control parameter calculated in real time.

Optionally, the determination unit further acquires maximum control error value during the position control of the servo and motor current values collected at each time point. The determination unit further calculates a transition duration value $T_2$ of the transition stage according to a preset formula based on the maximum control error value and the motor current values, and determines the transition duration of the transition stage according to the transition duration value and a time point when the constant parameter control stage ends, wherein the preset formula is as follows: $T_2$=T+ $k_1$·Max(abs(e(n)))+$k_2$·($\Sigma_0^n$I(n))/$T_1$, where T represents a preset minimum transition duration value, T1 represents a duration value corresponding to the constant parameter control stage, Max(abs(e(n))) represents the maximum control error value, I(n) represents the nth one of the motor current values detected during the position control of the servo and n is an integer greater than zero, and $K_1$ and $k_2$ are preset coefficients greater than zero.

Optionally, the first calculation unit further acquires real-time control error values during the position control of the servo according to a first preset formula, the first preset formula is as follows:

$$\begin{cases} k_{pa} = t * k_3 * e(n)^2 / T_2 \\ k_{ia} = t * k_4 * e(n)^2 / T_2 \\ k_{da} = t * k_5 * e(n)^2 / T_2 \end{cases},$$

where $K_3$, $k_4$, and $k_5$ represent preset coefficients greater than zero, $T_2$ represents the transition duration, and t represents the real-time operating duration in the transition stage. The first calculation unit further calculates the control parameter corresponding to the transition stage according to a second preset formula, based on the real-time control error values and the control parameter of the constant parameter control stage, the second preset formula is as follows: $K[k_p, k_i, k_d]=K_0[k_{p0}, k_{i0}, k_{d0}]+K_A[k_{pa}, k_{ia}, k_{da}]*t/T_2$, $t\in[0, T_2]$, where $K_0[k_{p0}, k_{i0}, k_{d0}]$ represents the control parameter corresponding to the constant parameter control stage, and $K_A[k_{pa}, k_{ia}, k_{da}]$ represents the real-time parameter compensation value.

Optionally, the parameter adjusting unit 64 includes a second adjusting unit and a second calculation unit. The second adjusting unit performs a transient adjustment to the servo when the constant parameter control stage ends, and acquires real-time control error values during the position control of the servo when the transient adjustment ends. The second calculation unit calculates the adaptive operation parameter corresponding to the adaptive parameter control stage according to the collected real-time control error values and the control parameter of the constant parameter control stage.

Optionally, the second calculation unit further acquires, at any time point, a real-time parameter compensation value corresponding to the real-time control error value e(n) according to a third preset formula, the third preset formula is as follows:

$$\begin{cases} k_{pa} = k_3 * e(n)^2 \\ k_{ia} = k_4 * e(n)^2 \\ k_{da} = k_5 * e(n)^2 \end{cases}$$

where $K_3$, $k_4$, and $k_5$ represent preset coefficients greater than zero. The second calculation unit further calculates the adaptive operation parameter corresponding to the adaptive parameter control stage according to a fourth preset formula based on the real-time control error values and the control parameter of the constant parameter control stage, the fourth preset formula is as follows: $K'[k_p, k_i, k_d]=K_0[k_{p0}, k_{i0}, k_{d0}]K'_A[k_{pa}, k_{ia}, k_{da}]$, $K_0[k_{p0}, k_{i0}, k_{d0}]$ represents the control parameter of the constant parameter control stage, and $K'_A[k_{pa}, k_{ia}, k_{da}]$ represents the real-time parameter compensation value.

Optionally, the acquiring unit 62 includes a detection unit and a reading unit. The detection unit acquires target position information about rotation of the output shaft in the motion control command, and detects real-time position information of the output shaft of the servo. The reading unit reads the speed information in the motion control command, and calculates the constant parameter control duration of the constant parameter control stage according to the target position information, the real-time position information of the output shaft of the servo, and the speed information; or reads the time information about rotation of the output shaft of the servo in the motion control command, and determines the time information as the constant parameter control duration of the constant parameter control stage.

In the embodiment, by acquiring the motion planning parameter carried by the motion control command and controlling the speed information obtained by the motion planning parameter, the output shaft of the servo is controlled to operate within a specified constant parameter control period, and a transient adjustment is performed to the servo in subsequent time period and an adaptive parameter is obtained. The control process of a single motion control command of the servo is divided into three stages, i.e. the constant parameter control stage, the transition stage and the adaptive parameter control stage, which enables the servo to perform motion response operations smoothly and quietly, while achieving high position control accuracy. Since the method for controlling the position of the servo provided by the embodiment of the present disclosure only requires a position sensor at the output shaft of the servo and sampling a motor current, it is ensured that the robot can also achieve better position control with ordinary hardware.

Individual function units according to the embodiments of the disclosure may be integrated in one processing unit, or the units may exist separately, or two or more units may be integrated in one unit. The foregoing integrated units may be realized in a form of hardware, or realized in a form of software functional units.

If the integrated unit is implemented in the form of software function unit and the software function unit is sold or used as separate products, the software function unit may also be stored in a computer readable storage medium. Based on such understanding, the technical solutions of the disclosure or the part of the disclosure that contributes to conventional technologies or part of the technical solutions may be embodied in the form of a software product. The computer software product is stored in a storage medium and includes several instructions for instructing a computer device (which may be a personal computer, a server, a network device or the like) or a processor to implement all of or part of the steps of the methods according to the embodiments of the disclosure. The foregoing storage medium includes various media that can store programs, for example, USB disks, mobile hard disk drives, read-only memories (ROMs), random access memories (RAMs), magnetic disks, optical disks and the like.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented position control method for a servo, comprising executing on a processor steps of:
   receiving, from a control terminal, a motion control command that comprises a motion planning parameter about position of an output shaft of the servo;
   acquiring speed information or time information indicated by the motion planning parameter, and determining a constant parameter control duration according to the speed information or time information;
   determining a control parameter corresponding to a constant parameter control stage according to the constant parameter control duration and a preset constant parameter, the constant parameter control stage being a first stage in execution of the motion control command;
   performing a transient adjustment to the servo when the constant parameter control stage ends, and changing the control parameter to an adaptive operation parameter when the transient adjustment ends; and
   controlling a rotation angle of the output shaft of the servo by a control algorithm to perform a position control of the servo, based on duration values and control parameters corresponding to each of a plurality of control stages;

wherein the control stages comprise the constant parameter control stage, a transition stage, and an adaptive parameter control stage, and the transition stage and the adaptive parameter control stage are a second stage and a third stage in the execution of the motion control command.

2. The method according to claim 1, wherein the step of performing the transient adjustment to the servo when the constant parameter control stage ends, and changing the control parameter to the adaptive operation parameter when the transient adjustment ends, comprises:

determining a transition duration of the transition stage when the constant parameter control stage ends;

calculating, within the transition duration, the control parameter corresponding to the transition stage according to a collected real-time parameter compensation value and the control parameter of the constant parameter control stage; and performing the transient adjustment to the servo, based on the control parameter calculated in real time.

3. The method according to claim 2, wherein the step of determining the transition duration of the transition stage when the constant parameter control stage ends, comprises:

acquiring a maximum control error value during the position control of the servo and motor current values collected at each time point;

calculating a transition duration value $T_2$ of the transition stage according to a preset formula based on the maximum control error value and the motor current values, and determining the transition duration of the transition stage according to the transition duration value and a time point when the constant parameter control stage ends, wherein the preset formula is as follows: $T_2=T+k_1 \cdot \text{Max}(\text{abs}(e(n)))+k_2 \cdot (\Sigma_0^n I(n))/T_1$, where T represents a preset minimum transition duration value, T1 represents a duration value corresponding to the constant parameter control stage, Max(abs(e(n))) represents the maximum control error value, I(n) represents the nth one of the motor current values detected during the position control of the servo and n is an integer greater than zero, and $K_1$ and $k_2$ are preset coefficients greater than zero.

4. The method according to claim 2, wherein the step of calculating, within the transition duration, the control parameter corresponding to the transition stage according to the collected real-time parameter compensation value and the control parameter of the constant parameter control stage, comprises:

acquiring real-time control error values during the position control of the servo according to a first preset formula, the first preset formula is as follows:

$$\begin{cases} k_{pa} = t*k_3*e(n)^2/T_2 \\ k_{ia} = t*k_4*e(n)^2/T_2 \\ k_{da} = t*k_5*e(n)^2/T_2 \end{cases}$$

where $K_3$, $k_4$, and $k_5$ represent preset coefficients greater than zero, $T_2$ represents the transition duration, and t represents the real-time operating duration in the transition stage; and calculating the control parameter corresponding to the transition stage according to a second preset formula, based on the real-time control error values and the control parameter of the constant parameter control stage, the second preset formula is as follows:

$K[k_p, k_i, k_d]=K_0[k_{p0}, k_{i0}, k_{d0}]+K_A[k_{pa}, k_{ia}, k_{da}]*t/T_2$, $t \in [0, T_2]$, where $K_0[k_{p0}, k_{i0}, k_{d0}]$ represents the control parameter corresponding to the constant parameter control stage, and $K_A[k_{pa}, k_{ia}, k_{da}]$ represents the real-time parameter compensation value.

5. The method according to claim 1, wherein the step of performing the transient adjustment to the servo when the constant parameter control stage ends, and changing the control parameter to the adaptive operation parameter when the transient adjustment ends, comprises:

performing a transient adjustment to the servo when the constant parameter control stage ends, and acquiring real-time control error values during the position control of the servo when the transient adjustment ends; and calculating the adaptive operation parameter corresponding to the adaptive parameter control stage according to the collected real-time control error values and the control parameter of the constant parameter control stage.

6. The method according to claim 5, wherein the step of calculating the adaptive operation parameter corresponding to the adaptive parameter control stage according to the collected real-time control error values and the control parameter of the constant parameter control stage, comprises:

acquiring, at any time point, a real-time parameter compensation value corresponding to the real-time control error value e(n) according to a third preset formula, the third preset formula is as follows:

$$\begin{cases} k_{pa} = k_3*e(n)^2 \\ k_{ia} = k_4*e(n)^2 \\ k_{da} = k_5*e(n)^2 \end{cases}$$

where $k_3$, $k_4$, and $k_5$ represent preset coefficients greater than zero; and calculating the adaptive operation parameter corresponding to the adaptive parameter control stage according to a fourth preset formula based on the real-time control error values and the control parameter of the constant parameter control stage, the fourth preset formula is as follows: $K'[k_p, k_i, k_d]=K_0[k_{p0}, k_{i0}, k_{d0}]+K'_A[k_{pa}, k_{ia}, k_{da}]$, where $K_0[k_{p0}, k_{i0}, k_{d0}]$ represents the control parameter of the constant parameter control stage, and $K'_A[k_{pa}, k_{ia}, k_{da}]$ represents the real-time parameter compensation values.

7. The method according to claim 1, wherein the step of receiving the motion control command from the control terminal, the motion control command comprising the motion planning parameter about position of the output shaft of the servo, comprises:

acquiring target position information about rotation of the output shaft in the motion control command, and detecting real-time position information of the output shaft of the servo;

reading the speed information in the motion control command, and calculating the constant parameter control duration of the constant parameter control stage according to the target position information, the real-time position information of the output shaft of the servo, and the speed information; or reading the time information about rotation of the output shaft of the servo in the motion control command, and determining the time information as the constant parameter control duration of the constant parameter control stage.

8. A robot comprising:
a servo;
one or more processors;
a storage; and
one or more computer programs stored in the storage and configured to be executed by the one or more processors, and the one or more computer programs being configured to execute a method, the method comprising steps of:
receiving, from a control terminal, a motion control command that comprises a motion planning parameter about position of an output shaft of the servo;
acquiring speed information or time information indicated by the motion planning parameter, and determining a constant parameter control duration according to the speed information or time information;
determining a control parameter corresponding to a constant parameter control stage according to the constant parameter control duration and a preset constant parameter, the constant parameter control stage being a first stage in execution of the motion control command;
performing a transient adjustment to the servo when the constant parameter control stage ends, and changing the control parameter to an adaptive operation parameter when the transient adjustment ends; and
controlling a rotation angle of the output shaft of the servo by a control algorithm to perform a position control of the servo, based on duration values and control parameters corresponding to each of a plurality of control stages;
wherein the control stages comprise the constant parameter control stage, a transition stage, and an adaptive parameter control stage, and the transition stage and the adaptive parameter control stage are a second stage and a third stage in the execution of the motion control command.

9. The robot according to claim 8, wherein the step of performing the transient adjustment to the servo when the constant parameter control stage ends, and changing the control parameter to the adaptive operation parameter when the transient adjustment ends, comprises:
determining a transition duration of the transition stage when the constant parameter control stage ends;
calculating, within the transition duration, the control parameter corresponding to the transition stage according to a collected real-time parameter compensation value and the control parameter of the constant parameter control stage; and
performing the transient adjustment to the servo, based on the control parameter calculated in real time.

10. The robot according to claim 9, wherein the step of determining the transition duration of the transition stage when the constant parameter control stage ends, comprises:
acquiring a maximum control error value during the position control of the servo and motor current values collected at each time point;
calculating a transition duration value $T_2$ of the transition stage according to a preset formula based on the maximum control error value and the motor current values, and determining the transition duration of the transition stage according to the transition duration value and a time point when the constant parameter control stage ends, wherein the preset formula is as follows: $T_2=T+k_1 \cdot Max(abs(e(n)))+k_2 \cdot (\Sigma_0{}^n I(n))/T_1$, where T represents a preset minimum transition duration value, T1 represents a duration value corresponding to the constant parameter control stage, Max(abs(e(n))) represents the maximum control error value, I(n) represents the nth one of the motor current values detected during the position control of the servo and n is an integer greater than zero, and $K_1$ and $k_2$ are preset coefficients greater than zero.

11. The robot according to claim 9, wherein the step of calculating, within the transition duration, the control parameter corresponding to the transition stage according to the collected real-time parameter compensation value and the control parameter of the constant parameter control stage, comprises:
acquiring real-time control error values during the position control of the servo according to a first preset formula, the first preset formula is as follows:

$$\begin{cases} k_{pa} = t*k_3*e(n)^2/T_2 \\ k_{ia} = t*k_4*e(n)^2/T_2 \\ k_{da} = t*k_5*e(n)^2/T_2 \end{cases}$$

where $K_3$, $k_4$, and $k_5$ represent preset coefficients greater than zero, $T_2$ represents the transition duration, and t represents the real-time operating duration in the transition stage; and
calculating the control parameter corresponding to the transition stage according to a second preset formula, based on the real-time control error values and the control parameter of the constant parameter control stage, the second preset formula is as follows:
$K[k_p, k_i, k_d]=K_0[k_{p0}, k_{i0}, k_{d0}]+K_A[k_{pa}, k_{ia}, k_{da}]*t/T_2$, $t \in [0, T_2]$, where $K_0[k_{p0}, k_{i0}, k_{d0}]$ represents the control parameter corresponding to the constant parameter control stage, and $K_A[k_{pa}, k_{ia}, k_{da}]$ represents the real-time parameter compensation value.

12. The robot according to claim 8, wherein the step of performing the transient adjustment to the servo when the constant parameter control stage ends, and changing the control parameter to the adaptive operation parameter when the transient adjustment ends, comprises:
performing a transient adjustment to the servo when the constant parameter control stage ends, and acquiring real-time control error values during the position control of the servo when the transient adjustment ends; and
calculating the adaptive operation parameter corresponding to the adaptive parameter control stage according to the collected real-time control error values and the control parameter of the constant parameter control stage.

13. The robot according to claim 12, wherein the step of calculating the adaptive operation parameter corresponding to the adaptive parameter control stage according to the collected real-time control error values and the control parameter of the constant parameter control stage, comprises:
acquiring, at any time point, a real-time parameter compensation value corresponding to the real-time control error value e(n) according to a third preset formula, the third preset formula is as follows:

$$\begin{cases} k_{pa} = k_3 * e(n)^2 \\ k_{ia} = k_4 * e(n)^2 \\ k_{da} = k_5 * e(n)^2 \end{cases}$$

where $k_3$, $k_4$, and $k_5$ represent preset coefficients greater than zero; and calculating the adaptive operation parameter corresponding to the adaptive parameter control stage according to a fourth preset formula based on the real-time control error values and the control parameter of the constant parameter control stage, the fourth preset formula is as follows: $K'[k_p, k_i, k_d] = K_0[k_{p0}, k_{i0}, k_{d0}] + K'_A[k_{pa}, k_{ia}, k_{da}]$, where $K_0[k_{p0}, k_{i0}, k_{d0}]$ represents the control parameter of the constant parameter control stage, and $K'_A[k_{pa}, k_{ia}, k_{da}]$ represents the real-time parameter compensation values.

14. The robot according to claim 8, wherein the step of receiving the motion control command from the control terminal, the motion control command comprising the motion planning parameter about position of the output shaft of the servo, comprises:

acquiring target position information about rotation of the output shaft in the motion control command, and detecting real-time position information of the output shaft of the servo;

reading the speed information in the motion control command, and calculating the constant parameter control duration of the constant parameter control stage according to the target position information, the real-time position information of the output shaft of the servo, and the speed information; or reading the time information about rotation of the output shaft of the servo in the motion control command, and determining the time information as the constant parameter control duration of the constant parameter control stage.

15. A non-transitory computer readable storage medium having stored therein instructions, which when executed by a robot, cause the robot to:

receive, from a control terminal, a motion control command that comprises a motion planning parameter about position of an output shaft of the servo;

acquire speed information or time information indicated by the motion planning parameter, and determine a constant parameter control duration according to the speed information or time information;

determine a control parameter corresponding to a constant parameter control stage according to the constant parameter control duration and a preset constant parameter, the constant parameter control stage being a first stage in execution of the motion control command;

perform a transient adjustment to the servo when the constant parameter control stage ends, and change the control parameter to an adaptive operation parameter when the transient adjustment ends; and control a rotation angle of the output shaft of the servo by a control algorithm to perform a position control of the servo, based on duration values and control parameters corresponding to each of a plurality of control stages;

wherein the control stages comprise the constant parameter control stage, a transition stage, and an adaptive parameter control stage, and the transition stage and the adaptive parameter control stage are a second stage and a third stage in the execution of the motion control command.

* * * * *